Patented July 15, 1941

2,249,538

UNITED STATES PATENT OFFICE 2,249,538

REVERSIBLE GEL COMPOSITIONS OF POLYVINYL ALCOHOL AND SUBSTITUTED HYDROXY AROMATIC COMPOUNDS AND THEIR PREPARATION

Wendell H. McDowell and William O. Kenyon, Rochester, N. Y., assignors to Eastman Kodak Company, Rochester, N. Y., a corporation of New Jersey No Drawing. Application February 12, 1940, Serial No. 318,553. In Great Britain February 14, 1939

7 Claims. (Cl. 252—316)

This invention relates to the preparation of thermal-reversible gels by treating polyvinyl alcohol with a substituted hydroxy aromatic compound and the thermal-reversible gels prepared therefrom.

The term "polyvinyl alcohol" as used herein is to be understood as referring to polymers in which at least 50% thereof is composed of vinyl alcohol constituent. It refers to polymers all of which is composed of vinyl alcohol units and also to polymers containing not only vinyl alcohol units but also vinyl acetate (and/or propionate and/or butyrate) units providing the vinyl alcohol units make up at least 50% of the polymer.

Ordinarily polyvinyl alcohol is a water-soluble material which does not show the properties of a gel under ordinary conditions. Therefore, polyvinyl alcohol does not ordinarily find use where there is any continued contact with water due to its lack of permanence in such a situation.

One object of our invention is to treat polyvinyl alcohol with a substituted hydroxy aromatic compound so as to convert it into a rigid gel which has thermal-reversible properties. A further object of our invention is to prepare a product from polyvinyl alcohol, having gel characteristics, so that it may be substituted for gelatin or other like materrials for the various purposes for which those materials are used.

We have found that when polyvinyl alcohol, regardless of viscosity, is mixed with the required amount of a substituted dihydric or a substituted trihydric phenol or a substituted monohydric naphthol or a mixture of substances coming under this classification, the polyvinyl alcohol forms an opaque, white gel, which is firm and strong. We have found that the product so prepared is thermal-reversible in that the gel is converted to a liquid upon heating but is reformed upon cooling the liquid and allowing it to stand. The gelling agent may be incorporated directly into an aqueous solution of the polyvinyl alcohol or it may be dissolved in water or in some cases in aqueous dilute alkali before adding thereto. Upon standing a polyvinyl alcohol gel is formed which can be redispersed upon heating.

The proportion of gelling agent employed may be varied depending on the conditions present. For instance, polyvinyl alcohol has been gelled with the herein described gelling agents in proportions from 25% up (based on the weight of the polyvinyl alcohol) in preparing gels in accordance with our invention, although soft gels are obtained with the lower proportions of gelling agents. The proportion of gelling agent, which is most desirable to use, depends on the temperature of gelling desired for the product formed, the viscosity of the polyvinyl alcohol, the concentration of the polyvinyl alcohol and the particular gelling agent which is used. With higher viscosity polyvinyl alcohol, the proportion of gelling agent need not be as great as with the lower viscosity polyvinyl alcohols to cause gelling within time which would be practical. The proportion of gelling agent also depends on the agent used and on the hardness or firmness desired for the gel. For instance, if a polyvinyl alcohol, having a molecular weight of 19,800 is used in an aqueous solution containing 5.6% by weight of polyvinyl alcohol, a firm gel may readily be obtained by adding approximately 30% (based on the weight of the polyvinyl alcohol) of phloroglucinol thereto and allowing the mass to stand.

The effectiveness of the gelling agents of our invention vary to some extent. For instance the gel obtained by using orcinol or gallic acid in a proportion of 21–24% based on the polyvinyl alcohol under the same conditions is comparable to that obtained by using approximately 30% of phloroglucinol. Greater amounts of gelling agents than those given may be used. For instance any amount in the range from approximately 25% or even lower in the case of some of the gelling agents up to 100% or 200% or even more may be employed to form a rigid gel of the polyvinyl alcohol. For economic reasons it is desirable to not use greater than an amount of gelling agent equal to the amount of polyvinyl alcohol.

The proportion of gelling agent employed may be varied depending upon the conditions of treatment. Using higher viscosity polyvinyl alcohol, the proportion of gelling agent need not be as great as with the lower viscosity alcohols. As gelling is facilitated by lower temperatures the employment of a lesser amount of gelling agent is necessary where the temperature is lowered to below 20° C. after mixing the gelling agent with the polyvinyl alcohol at a higher temperature. Other features which cause variation in the necessary proportion of gelling agent to give a rigid gel are the concentration of the solution of polyvinyl alcohol which is treated and the hardness or firmness desired for the gel to be obtained.

We have found that for a temperature of 25° C. an amount of 25% of substituted hydroxy aromatic gelling agent (based on the weight of the resin) usually suffices to get an aqueous polyvinyl alcohol dope containing 5.6% by weight of polyvinyl alcohol. If desired greater amounts of gelling agent may be employed and might even be desirable for more dilute solutions of polyvinyl alcohol or for the causing of gelling at higher temperatures. The polyvinyl alcohol referred to has a molecular weight of approximately 19,000. However, our gelling process is also applicable to polyvinyl alcohol requiring a greater proportion of gelling agent than do the higher viscosity alcohols. The gels formed in accordance with our process may be converted to a sol upon application of heat. A gel is again formed upon cooling the liquid. For convenience of operation, the range of 3-7% for the concentration of polyvinyl alcohol in water is preferred for the polyv.nyl alcohols usually used. These polyvinyl alcohols are ordinarily of a viscosity which gives a molecular weight of approximately 6700–19,800. With higher viscosity polyvinyl alcohols concentrations of less than 3% might be desirable, while with lower viscosity polyvinyl alcohols, a concentration of more than 7% might be employed.

The presence of alkali in the gelling of polyvinyl alcohol with hydroxy aromatic compounds decreases the efficiency of the gelling action. Therefore it is preferred that alkali be absent in gelling polyvinyl alcohol in accordance with our invention. The presence of an excessive amount of alkali prevents gelling. The amount of alkali present, if any, should be considerably less than that which will combine with all of the hydroxyl groups of the hydroxy aromatic compounds.

The substituted dihydric and trihydric phenols which we have found are effective gelling agents for polyvinyl alcohol are orcinol, 2-4 dihydroxybenzoic acid, 4-chlororesorcinol and gallic acid. These gelling agents are about equally effective. Other substituted hydroxy aromatic compounds which have been found to be effective gelling agents are substituted monohydric naphthols such as 5-amino-1-naphthol hydrochloride and 1-amino-4-naphthol hydrochloride. In addition these substituted naphthol gelling agents are very effective dispersants for silver halides and thus particularly valuable for making gels for use in making photographic emulsions.

The following examples illustrate the gelling of polyvinyl alcohol using a substituted hydroxy aromatic compound in accordance with our invention.

Example I 1 gram of orcinol was added to 50 grams of a solution of a medium viscosity polyvinyl alcohol containing 5.6% by weight of the polyvinyl alcohol at a temperature of 70° C. Upon inspection of the mass after it had cooled to room temperature it was found that a firm rigid gel had formed. The mass was heated and became a liquid which was found to be susceptible to coating out onto a surface such as paper or glass. Upon cooling the coating gelled. To cure the coating it was treated with a current of warm air which formed a hard gelatin-like layer upon the surface to which it had been applied.

Example II 1.2 grams of 2,4 dihydroxy-benzoic acid was added to 50 grams of an aqueous solution of a medium viscosity polyvinyl alcohol containing 5.6% by weight of the alcohol, while the solution was at a temperature of 70° C. The mass was examined after it had cooled to room temperature and a firm, white, thermal-reversible gel had formed.

Example III 1 gram of gallic acid was added to 50 grams of an aqueous solution of polyvinyl alcohol containing 5.6% of the alcohol at a temperature of 70° C. The mass was examined after it had cooled to room temperature and a firm, white gel had formed.

The gels obtained in accordance with our invention may be used for various purposes; for instance, they may be used for making photographic emulsions, acting as the protective colloid for the photosensitive silver halide as described and claimed in Lowe application Serial No. 318,559 filed of even date. As pointed out above the amino-substituted naphthols act as dispersants for silver halides and thereby contribute to the fineness of grain of the emulsions using them as a gelling agent. If dye or coloring material is incorporated therein they may be employed in the form of sheeting for safelights or for light filters in photographic apparatus. Other uses to which these gels may be put are subbing layers in photographic film, overcoatings, or backings for film, as adhesives, thickening agents, or sizings for paper or cloth or for use in coating compositions. These gels particularly after they have been coated out into the form of a sheet or layer may be hardened such as by treating with formaldehyde, bichromates, chrome alum or diketones. If desired plasticizers may be incorporated with the gels particularly if the formation of flexible sheeting therefrom is contemplated. Some of the plasticizers which may be employed are ethylene glycol, glycerol or monoacetin. The sheeting may be prepared by coating out the sol on to a film-forming surface and allowing it to solidify or gel followed by drying.

As pointed out previously gels may be prepared using either polyvinyl alcohol or polyvinyl compounds containing a sufficient proportion of hydroxyl groups so as to be a polyvinyl alcohol for all practical purposes. The criterion as to whether the hydrolyzed polyvinyl ester may be employed as the polyvinyl alcohol is whether or not it is soluble in water. If the polvinyl ester containing a large proportion of hydroxyl is soluble in water, a rigid opaque gel may be formed therefrom in accordance with our invention.

All of the polyvinyl esters of the lower fatty acids containing at least 50% of vinyl alcohol are suitable for use as the starting material in our invention. These water-soluble polyvinyl esters, such as polyvinyl acetate may be prepared by hydrolyzing the polyvinyl ester with hydrochloric acid and water as described in U. S. Patent No. 1,971,951 of Skirrow and Morrison until the resin has a vinyl alcohol content of at least 50%. It is to be noted that the gelled polyvinyl alcohol in accordance with our invention has advantages over natural products in that a resin of definite purity can be obtained and the treatment with the gelling agent can be standardized in contrast to natural products whose properties may vary markedly due to the difference in different batches of material. Therefore, the gelled polyvinyl alcohol in various uses lends itself to standardization in those processes. The gels are obtained in opaque form in the gelling process of our invention, but give clear coatings when dried in layer form.

We claim:

1. A firm, thermal-reversible gel composed of polyvinyl alcohol mixed with a gelling amount of a substituted hydroxy aromatic compound selected from the group consisting of orcinol, 2-4 dihydroxy benzoic acid, 4-chlor resorcinol, gallic acid and the substituted monohydric naphthols.

2. A firm, thermal-reversible gel composed of polyvinyl alcohol mixed with a gelling amount of orcinol.

3. A firm, thermal-reversible gel composed of polyvinyl alcohol mixed with a gelling amount of a substituted monohydric naphthol.

4. A method of preparing a thermal-reversible gel which comprises mixing an aqueous solution of a polyvinyl alcohol with a gelling agent in a gelling amount selected from the group consisting of orcinol, 2-4 dihydroxy benzoic acid, 4-chlor resorcinol, gallic acid and the substituted monohydric naphthols at a temperature at which the mixture retains its liquid form and subsequently lowering the temperature to a point at which the formation of a gel occurs.

5. A method of preparing a thermal-reversible gel which comprises mixing an aqueous solution of polyvinyl alcohol with a gelling amount of orcinol at a temperature at which the mixture retains its liquid form and subsequently lowering the temperature to a point at which the formation of a gel occurs.

6. A method of preparing a thermal-reversible gel which comprises mixing an aqueous solution of polyvinyl alcohol with a gelling amount of gallic acid at a temperature at which the mixture retains its liquid form and subsequently lowering the temperature to a point at which the formation of a gel occurs.

7. A method of preparing a thermal-reversible gel which comprises mixing an aqueous solution of polyvinyl alcohol with a gelling amount of 5-amino-1-naphthol hydrochloride at a temperature at which the mixture retains its liquid form and subsequently lowering the temperature to a point at which the formation of a gel occurs.

WENDELL H. McDOWELL.
WILLIAM O. KENYON.